US009065302B2

(12) United States Patent
Kamata et al.

(10) Patent No.: US 9,065,302 B2
(45) Date of Patent: Jun. 23, 2015

(54) WIRELESS POWER FEEDING SYSTEM

(75) Inventors: Koichiro Kamata, Kanagawa (JP); Shinya Okano, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 694 days.

(21) Appl. No.: 13/313,503

(22) Filed: Dec. 7, 2011

(65) Prior Publication Data
US 2012/0161536 A1 Jun. 28, 2012

(30) Foreign Application Priority Data

Dec. 24, 2010 (JP) ................................. 2010-287551

(51) Int. Cl.
*H02J 17/00* (2006.01)
*H02J 7/02* (2006.01)
*H01F 27/42* (2006.01)

(52) U.S. Cl.
CPC *H02J 17/00* (2013.01); *H02J 7/025* (2013.01)

(58) Field of Classification Search
USPC ......................................... 307/104
See application file for complete search history.

(56) References Cited

U.S. PATENT DOCUMENTS

| 5,124,699 | A | 6/1992 | Tervoert et al. |
| 5,428,521 | A | 6/1995 | Kigawa et al. |
| 5,652,423 | A | 7/1997 | Saitoh et al. |
| 5,790,946 | A | 8/1998 | Rotzoll |
| 6,509,217 | B1 | 1/2003 | Reddy |
| 6,737,302 | B2 | 5/2004 | Arao |
| 6,837,438 | B1 | 1/2005 | Takasugi et al. |
| 7,180,421 | B2 | 2/2007 | Pahlaven et al. |
| 7,209,771 | B2 | 4/2007 | Twitchell, Jr. |
| 7,301,830 | B2 | 11/2007 | Takahashi et al. |
| 7,394,382 | B2 | 7/2008 | Nitzan et al. |
| 7,675,358 | B2 | 3/2010 | Atsumi |
| 7,907,902 | B2 | 3/2011 | Kato et al. |
| 8,461,719 | B2 * | 6/2013 | Kesler et al. .................. 307/104 |
| 2002/0049714 | A1 | 4/2002 | Yamazaki et al. |
| 2003/0017804 | A1 | 1/2003 | Heinrich et al. |
| 2003/0104848 | A1 | 6/2003 | Brideglall |
| 2004/0077383 | A1 | 4/2004 | Lappetelainen et al. |
| 2004/0128246 | A1 | 7/2004 | Takayama et al. |

(Continued)

FOREIGN PATENT DOCUMENTS

| JP | 06-006272 | 1/1994 |
| JP | 10-285087 | 10/1998 |

(Continued)

OTHER PUBLICATIONS

Kurs. A et al. "Wireless Power Transfer via Strongly Coupled Magnetic Resonances", Science, vol. 317, Jul. 6, 2007, pp. 83-86.

*Primary Examiner* — Robert Deberadinis
(74) *Attorney, Agent, or Firm* — Nixon Peabody LLP; Jeffrey L. Costellia

(57) ABSTRACT

A wireless power feeding system includes a power feeding device and a power receiving device. The power feeding device includes a first resonance coil connected to a high-frequency power source through a first matching circuit, and a first control circuit connected to the first matching circuit and a first transmitter-receiver circuit. The power receiving device includes a second resonance coil configured to be in magnetic resonance with the first resonance coil, and a second control circuit connected to a load, a second matching circuit, and a second transmitter-receiver circuit.

29 Claims, 8 Drawing Sheets

(56) References Cited

U.S. PATENT DOCUMENTS

| | | |
|---|---|---|
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2010/0052431 A1 | 3/2010 | Mita |
| 2010/0244577 A1 | 9/2010 | Shimokawa |
| 2010/0244839 A1 | 9/2010 | Yoshikawa |
| 2010/0259109 A1 | 10/2010 | Sato |
| 2010/0289449 A1 | 11/2010 | Elo |
| 2011/0049995 A1 | 3/2011 | Hashiguchi |
| 2011/0080053 A1 | 4/2011 | Urano |
| 2011/0095619 A1 | 4/2011 | Urano |
| 2011/0101791 A1 | 5/2011 | Urano |
| 2011/0169337 A1 | 7/2011 | Kozakai |
| 2011/0241440 A1 | 10/2011 | Sakoda et al. |
| 2011/0248572 A1 | 10/2011 | Kozakai et al. |
| 2011/0270462 A1 | 11/2011 | Amano et al. |
| 2012/0032521 A1 | 2/2012 | Inoue et al. |

FOREIGN PATENT DOCUMENTS

| | | |
|---|---|---|
| JP | 11-088243 | 3/1999 |
| JP | 2002-259921 | 9/2002 |
| JP | 2003-085506 | 3/2003 |
| JP | 2005-063123 | 3/2005 |
| JP | 2006-180073 | 7/2006 |
| JP | 2007-183790 | 7/2007 |
| JP | 2010-068657 | 3/2010 |
| JP | 2010-119246 | 5/2010 |
| JP | 2010-193598 | 9/2010 |
| JP | 2010-239690 | 10/2010 |
| JP | 2010-252446 | 11/2010 |
| JP | 2010-252468 | 11/2010 |
| JP | 2010-252497 | 11/2010 |
| JP | 2010-268665 | 11/2010 |
| JP | 2010-284006 | 12/2010 |
| JP | 2010-284066 | 12/2010 |
| JP | 2011-120410 | 6/2011 |
| JP | 2011-121456 | 6/2011 |
| JP | 2011-125184 | 6/2011 |
| JP | 2011-130614 | 6/2011 |
| JP | 2011-135717 | 7/2011 |
| JP | 2011-142769 | 7/2011 |
| WO | WO 2010/055381 A1 | 5/2010 |

* cited by examiner

| No. | parameters of first matching circuit | | parameters of second matching circuit | | distance from power feeding device [cm] |
|---|---|---|---|---|---|
| 0 | $Cs0_0$ | $Lp0_0$ | $Cs1_0$ | $Lp1_0$ | $A_0$ |
| 1 | $Cs0_1$ | $Lp0_1$ | $Cs1_1$ | $Lp1_1$ | $A_1$ |
| 2 | $Cs0_2$ | $Lp0_2$ | $Cs1_2$ | $Lp1_2$ | $A_2$ |
| ⋮ | ⋮ | ⋮ | ⋮ | ⋮ | ⋮ |
| j | $Cs0_j$ | $Lp0_j$ | $Cs1_j$ | $Lp1_j$ | $A_j$ |
| ⋮ | ⋮ | ⋮ | ⋮ | ⋮ | ⋮ |
| n | $Cs0_n$ | $Lp0_n$ | $Cs1_n$ | $Lp1_n$ | $A_n$ |

FIG. 6A1
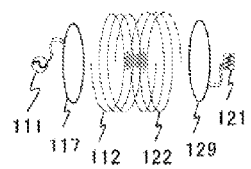
FIG. 6B1
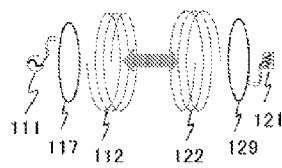
FIG. 6C1
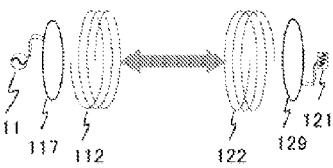
FIG. 6A2
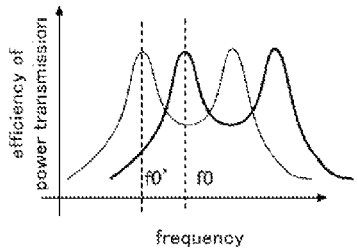
FIG. 6B2
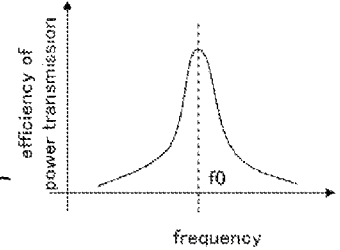
FIG. 6C2
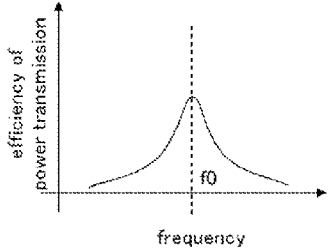

WIRELESS POWER FEEDING SYSTEM

BACKGROUND OF THE INVENTION

1. Field of the Invention

The present invention relates to a power feeding device and a wireless power feeding system including the power feeding device.

2. Description of the Related Art

Various electronic appliances have spread and a variety of products is shipped to the market. In recent years, the spread of portable electronic appliances such as cellular phones and digital video cameras is apparent. In addition, electric mobile units powered by electricity, such as electric cars, are going on the market.

A cellular phone, a digital video camera, or an electric mobile unit has a built-in battery serving as a storage battery. Currently, the battery is made, in most cases, in direct contact with a household AC power source, which serves as a power feeding unit, to be charged. In addition, a unit without a battery or a unit which does not use power stored in a battery is currently powered by direct feeding electricity to the unit from a household AC power source through wiring or the like.

On the other hand, research and development of methods of wirelessly charging batteries or feeding electricity to loads is advancing. Typical examples include the electromagnetic coupling method (also called the electromagnetic induction method), the radio wave method (also called the micro wave method), and the resonance method. Some of electronic appliances using the electromagnetic coupling method, including small home electrical appliances, have already spread.

Wireless power feeding systems using the resonance method are being developed in order to increase efficiency of power transmission (power transmission efficiency) as described in Patent Document 1 or 2.

REFERENCE

Patent Document

[Patent Document 1] Japanese Published Patent Application No. 2010-193598
[Patent Document 2] Japanese Published Patent Application No. 2010-239690

SUMMARY OF THE INVENTION

In a wireless power feeding system using the resonance method, the conditions for the high efficiency of power transmission vary depending on the distance from a resonance coil included in a device receiving power (hereinafter called a power receiving device) to a resonance coil included in a device feeding power (hereinafter called a power feeding device), making it difficult to stably transmit power with high efficiency.

If the positional relationship between the power receiving device and the power feeding device change during power feeding, efficiency of power transmission may decrease.

In view of this, an object of one embodiment of the present invention is to provide a power feeding system using the resonance method, which can increase efficiency of power transmission.

One embodiment of the present invention is a wireless power feeding system including a power feeding device and a power receiving device. The power feeding device includes a first resonance coil connected to a high-frequency power source (also referred to as a radio-frequency power source) through a first matching circuit, and a first control circuit connected to the first matching circuit and a first transmitter-receiver circuit. The power receiving device includes a second resonance coil configured to be in magnetic resonance with the first resonance coil; and a second control circuit connected to a load, a second matching circuit, and a second transmitter-receiver circuit.

In this wireless power feeding system, the first matching circuit and the second matching circuit have an identical circuit configuration.

In this wireless power feeding system, the first matching circuit includes a first element connected to the high-frequency power source in series, and a second element connected to the high-frequency power source in parallel. The second matching circuit includes a third element connected to the load in series, and a fourth element connected to the load in parallel.

In this wireless power feeding system, the first element and the third element have an identical configuration, and the second element and the fourth element have an identical configuration.

In this wireless power feeding system, the first element and the third element are variable capacitors, and the second element and the fourth element are variable coils.

One embodiment of the present invention is a wireless power feeding system including a power feeding device and a power receiving device. The power feeding device includes a first coil connected to a high-frequency power source, a first resonance coil magnetically coupled with the first coil, a first matching circuit connected to the first resonance coil, and a first control circuit connected to the first matching circuit and a first transmitter-receiver circuit. The power receiving device includes a second resonance coil configured to be in magnetic resonance with the first resonance coil; a second matching circuit connected to the second resonance coil; a second coil magnetically coupled with the second resonance coil and connected to a load through a second rectifier circuit; and a second control circuit connected to the load, the second matching circuit, and a second transmitter-receiver circuit.

One embodiment of the present invention is a wireless power feeding system including a power feeding device and a power receiving device. The power feeding device includes a first coil connected to a high-frequency power source through a first matching circuit, a first resonance coil magnetically coupled with the first coil, and a first control circuit connected to the first matching circuit and a first transmitter-receiver circuit. The power receiving device includes a second resonance coil configured to be in magnetic resonance with the first resonance coil; a second coil magnetically coupled with the second resonance coil and connected to a load through a second matching circuit and a rectifier circuit; and a second control circuit connected to the load, the second matching circuit, and a second transmitter-receiver circuit.

In any of these wireless power feeding systems, the first matching circuit and the second matching circuit have an identical circuit configuration.

In any of these wireless power feeding systems, the first matching circuit includes a fifth element connected to the first resonance coil, and the second matching circuit includes a sixth element connected to the second resonance coil.

In any of these wireless power feeding systems, the fifth element and the sixth element are variable capacitors.

One embodiment of the present invention can provide a wireless power feeding system using the resonance method, which can increase efficiency of power transmission in accordance with the positional relationship between the power receiving device and the power feeding device during power feeding. Thus, the power feeding device can feed power efficiently to the power receiving device. Therefore, the power feeding system can be more convenient for users.

BRIEF DESCRIPTION OF THE DRAWINGS

FIGS. 6A1, 6B1, and 6C1 are diagrams used to describe the configuration of Embodiment 1, and FIGS. 6A2, 6B2, and 6C2 are graphs used to describe the configuration of Embodiment 1.

DETAILED DESCRIPTION OF THE INVENTION

Figure 1:
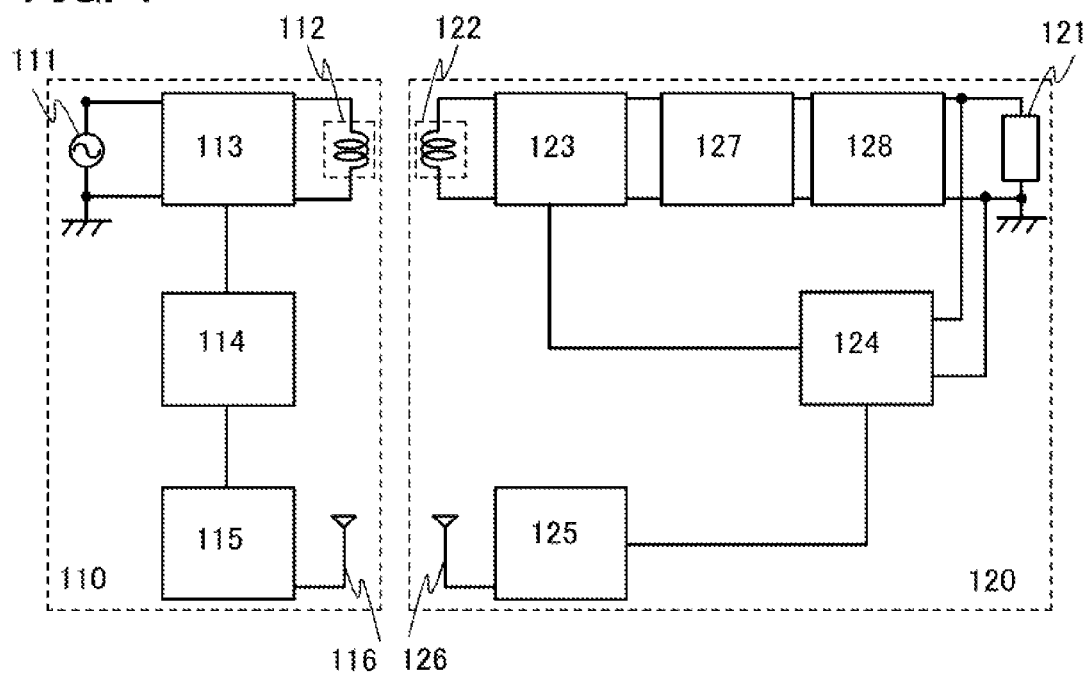
FIG. 1 is a diagram used to describe the configuration of Embodiment 1.

Embodiments of the present invention will be described below with reference to the drawings. Note that the embodiments can be implemented in various different ways. It will be readily appreciated by those skilled in the art that modes and details of the embodiments can be modified in various ways without departing from the spirit and scope of the present invention. The present invention therefore should not be construed as being limited to the description of the embodiments. Note that in structures of the present invention described below, reference numerals denoting the same portions are used in common in different drawings.

Note that, the size, layer thickness, and signal waveform of each object shown in the drawings and the like in the embodiments are exaggerated for simplicity in some cases. Each object therefore is not necessarily in such scales.

Note that, in this specification, the terms "first" to "n-th (n is a natural number)" are used only to prevent confusion between components, and thus do not limit numbers.

Embodiment 1

This embodiment describes a wireless power feeding system in one embodiment of the present invention, which feeds power wirelessly by using the resonance method.

<Configuration of Wireless Power Feeding System>

FIG. 1 shows the configuration of a wireless power feeding system in one embodiment of the present invention. The wireless power feeding system in FIG. 1 uses the resonance method. The wireless power feeding system in FIG. 1 includes a power feeding device 110 and a power receiving device 120. In FIG. 1, a first resonance coil 112 in the power feeding device 110 and a second resonance coil 122 in the power receiving device 120 are in resonance with each other, which enables power transmission by electromagnetic waves.

The power feeding device 110 includes a high-frequency power source (also referred to as a radio-frequency power source) 111, the first resonance coil 112, a first matching circuit 113, a first control circuit 114, a first transmitter-receiver circuit 115, and a first antenna 116. In the power feeding device 110, the high-frequency power source 111 is connected to the first resonance coil 112 through the first matching circuit 113, and the first matching circuit 113 is connected to the first transmitter-receiver circuit 115 through the first control circuit 114.

The power receiving device 120 includes a load 121, the second resonance coil 122, a second matching circuit 123, a second control circuit 124, a second transmitter-receiver circuit 125, a second antenna 126, a rectifier circuit 127, and a DCDC converter 128. In the power receiving device 120, the second resonance coil 122 is connected to the load 121 through the second matching circuit 123, the rectifier circuit 127, and the DCDC converter 128, and the load 121 is connected to the second matching circuit 123 and the second transmitter-receiver circuit 125 through the second control circuit 124. Note that the DCDC converter may be incorporated in the load 121.

In the power receiving device 120, although not shown in the drawing, an A/D converter circuit may be provided between the load 121 and the second control circuit 124, and a D/A converter circuit may be provided between the second control circuit 124 and the second matching circuit 123. In the power feeding device 110, a D/A converter circuit may be provided between the first control circuit 114 and the first matching circuit 113. In addition, the second control circuit 124 may include an A/D converter circuit.

The first matching circuit 113 in the power feeding device 110 includes at least one element connected to the high-frequency power source 111 in series and at least one element connected to the high-frequency power source 111 in parallel. The second matching circuit 123 in the power receiving device 120 includes at least one element connected to the load 121 in series and at least one element connected to the load 121 in parallel. In this specification, an element refers to a capacitor, a variable capacitor, a coil, or a variable coil.

In the first matching circuit 113, at least either an element connected to the high-frequency power source 111 in series or an element connected to the high-frequency power source 111 in parallel is preferably a variable element (a variable capacitor or a variable coil). Similarly, in the second matching circuit 123, at least either an element connected to the load 121 in series or an element connected to the load 121 in parallel is preferably a variable element (a variable capacitor or a variable coil). The impedance of the first matching circuit 113 can be controlled by a signal from the first control circuit 114 by a variable element in the first matching circuit 113. The impedance of the second matching circuit 123 can be controlled by a signal from the second control circuit 124 by a variable element in the second matching circuit 123. An element included in the first matching circuit 113 and connected to the high-frequency power source 111 in series preferably has the same configuration as an element included in the second matching circuit 123 and connected to the load 121 in series. The element included in the first matching circuit 113 and connected to the high-frequency power source 111 in parallel preferably has the same configuration as the element included in the second matching circuit 123 and connected to the load 121 in parallel.

For example, when the element included in the first matching circuit 113 and connected to the high-frequency power source 111 in series is a capacitor, the element included in the second matching circuit 123 and connected to the load 121 in series is preferably a capacitor as well. Meanwhile, when the element included in the first matching circuit 113 and connected to the high-frequency power source 111 in parallel is a coil, the element included in the second matching circuit 123 and connected to the load 121 in parallel is preferably a coil as well.

This embodiment describes the case where the first matching circuit 113 includes a variable capacitor Cs0 connected to the high-frequency power source 111 in series and a variable coil Lp0 connected to the high-frequency power source 111 in parallel, while the second matching circuit 123 includes a variable capacitor Cs1 connected to the load 121 in series and a variable coil Lp1 connected to the load 121 in parallel.

In the wireless power feeding system using the resonance method, the conditions for the maximum efficiency of power transmission vary depending on the distance from the first resonance coil 112 in the power feeding device 110 to the second resonance coil 122 in the power receiving device 120. For this reason, the parameters of the first matching circuit 113 and the parameters of the second matching circuit 123 are preferably set according to the distance from the power feeding device 110 to the power receiving device 120 such that the maximum efficiency of power transmission is obtained. Here, the parameters of the first matching circuit 113 refers to the impedances of a (variable) capacitor and a (variable) coil in the first matching circuit 113. The parameters of the second matching circuit 123 refers to the impedances of a (variable) capacitor and a (variable) coil in the second matching circuit 123. In this specification, the distance from the power feeding device 110 to the power receiving device 120 refers to the distance from the first resonance coil 112 to the second resonance coil 122.

Figures 2A, 2B:
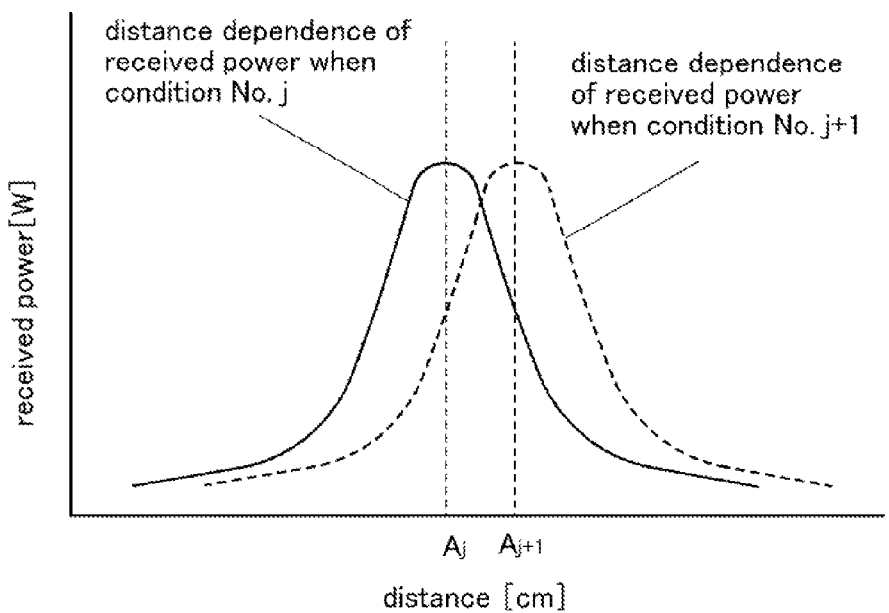
FIGS. 2A and 2B are a table and graph used to describe the configuration of Embodiment 1, respectively.

FIG. 2A is a table showing the parameters of the first matching circuit 113 and the parameters of the second matching circuit 123 which are set according to the distance from the power feeding device 110 to the power receiving device 120 such that the maximum efficiency of power transmission is obtained. In FIG. 2A, a set of the parameters of the first matching circuit 113, the parameters of the second matching circuit 123, and the distance from the power feeding device 110 to the power receiving device 120 is referred to as a parameter set, and each parameter set is numbered. Note that No. 0 represents the initial states of the first matching circuit 113 and the second matching circuit 123.

FIG. 2B shows the relation between the distance from the power feeding device 110 to the power receiving device 120, and received power. In the graph of FIG. 2B, the heavy solid line indicates the relation between the distance from the power feeding device 110 to the power receiving device 120 and received power, which is given by the parameter set No. j. In the graph of FIG. 2B, the dotted line indicates the relation between the distance from the power feeding device 110 to the power receiving device 120 and the received power, which is given by the parameter set No. j+1. Note that the received power refers to power fed to the load 121 in the power receiving device 120.

For example, as shown in FIG. 2A, with the parameter set No. j where the parameters of the first matching circuit 113 are $Cs0_j$ and $Lp0_j$ and the parameters of the second matching circuit 123 are $Cs1_j$ and $Lp1_j$, the maximum efficiency of power transmission is obtained when the distance from the power feeding device 110 to the power receiving device 120 is $A_j$ cm. When the distance from the power feeding device 110 to the power receiving device 120 is $A_j$ cm, the maximum power transmission efficiency is obtained and the maximum received power is therefore obtained (see the solid line in FIG. 2B).

For example, in the case where the parameters of the first matching circuit 113 are $Cs0_j$ and $Lp0_j$ and the parameters of the second matching circuit 123 are $Cs1_j$ and $Lp1_j$, the maximum efficiency of power transmission is not obtained if the distance from the power feeding device 110 to the power receiving device 120 is $A_{j+1}$ cm (see the solid line in FIG. 2B). When the distance from the power feeding device 110 to the power receiving device 120 is $A_{j+1}$ cm, the parameters of the first matching circuit 113 $Cs0_{j+1}$ and $Lp0_{j+1}$ and the parameters of the second matching circuit 123 $Cs1_{j+1}$ and $Lp1_{j+1}$ give the maximum efficiency of power transmission, resulting in the maximum received power (see the dotted lines in FIG. 2B).

<Power Feeding Method for Wireless Power Feeding System>

Figure 3:
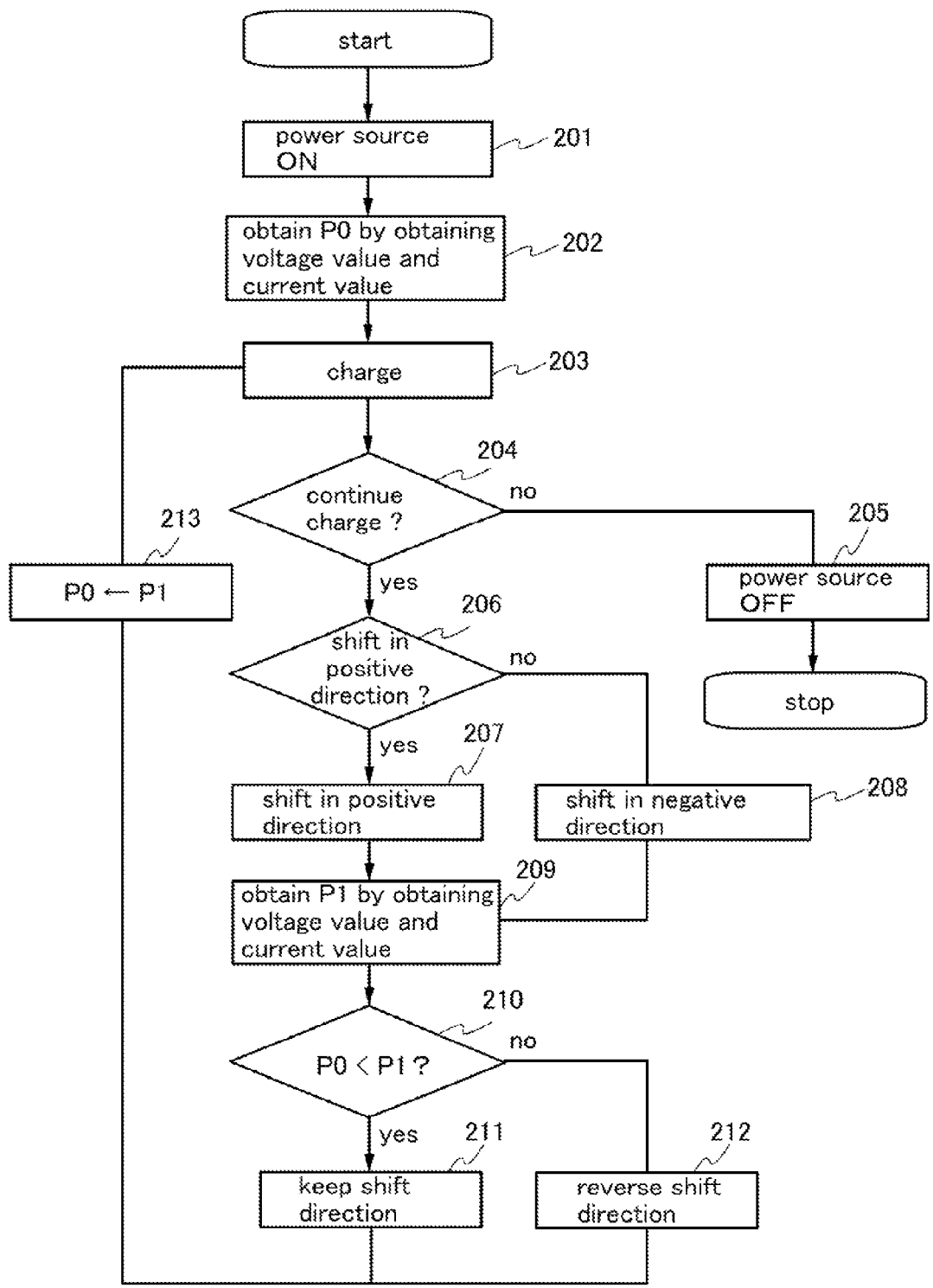
FIG. 3 is a flow chart used to describe the configuration of Embodiment 1.

Next, a power feeding method for a wireless power feeding system in one embodiment of the present invention will be described with reference to FIG. 1, FIGS. 2A and 2B, and FIG. 3. FIG. 3 is a flow chart showing an example of a power feeding method for the wireless power feeding system.

First, the power feeding device 110 starts to transmit power to the power receiving device 120 once the power receiving device 120 is placed at a given distance from the power feeding device 110. Turning on the high-frequency power source 111 in the power feeding device 110 starts the power transmission (see the step 201 shown in FIG. 3). At this time, the parameters of the first matching circuit 113 in the power feeding device 110 and the parameters of the second matching circuit 123 in the power receiving device 120 are in the initial states (the parameter set. No. 0 in FIG. 2A, for example), so that efficient power transmission is not always achieved, that is, the maximum transmission efficiency is not always obtained in this step. Note that this embodiment describes the case where the parameter set is shifted from the parameter set No. 1 in the positive direction.

Once the power feeding device 110 starts to transmit power to the power receiving device 120, the power is transmitted from the first resonance coil 112 of the power feeding device 110 to the second resonance coil 122 of the power receiving device 120 by magnetic resonance coupling, then converted into DC voltage and DC by the rectifier circuit 127 and the DCDC converter 128, and then applied to the load 121 (including at least either a secondary battery, an LED, or an IC chip, for example). At this time, the second control circuit 124 in the power receiving device 120 obtains the values of DC voltage and DC applied to the load 121 (see the step 202 in FIG. 3). In the case, for example, where the second control circuit 124 includes an A/D converter circuit, a DC voltage value and a DC value are converted from analog signals to digital signals, and then obtained by the second control circuit 124. The product of the DC voltage value and the DC value at this time is a power value P0. Data of the obtained product of the DC voltage value and the DC value (power value P0) may be stored in a memory device (not shown in the drawing) connected to the second control circuit 124.

Next, the load 121 is charged (power is fed to the load 121) for a certain period of time (300 msec, for example) (see the step 203 in FIG. 3).

Subsequently, the second control circuit 124 determines whether the load 121 charging is continued (see the step 204 in FIG. 3). If the second control circuit 124 determines that the load 121 charging is not continued, the high-frequency power source 111 is turned off to complete the charging (see the step 205 in FIG. 3). If the second control circuit 124 determines that the load 121 charging is continued, the next step is taken.

Next, the second control circuit 124 determines whether the parameter set is shifted in the positive direction (see the step 206 in FIG. 3). If the second control circuit 124 determines that the parameter set is not shifted in the positive direction, the second control circuit 124 sends an instruction to the second matching circuit 123 and the first matching circuit 113 to shill the parameter set in the negative direction (see the step 208 in FIG. 3). If the second control circuit 124 determines that the parameter set is shifted in the positive direction, the second control circuit 124 sends an instruction to the second matching circuit 123 and the first matching circuit 113 to shift the parameter set in the positive direction (see the step 207 in FIG. 3). In order for the second matching circuit 123 to send an instruction to the first matching circuit 113, the second control circuit sends an instruction to the second transmitter-receiver circuit 125, and the instruction is sent from the second transmitter-receiver circuit 125 to the first transmitter-receiver circuit 115 through the antennas 126 and 116, and then sent from the first transmitter-receiver circuit 115 to the first matching circuit 113 through the first control circuit 114.

Then, the second control circuit 124 obtains a DC voltage value and a DC value given after the parameter set is shifted in the positive or negative direction (see the step 209 in FIG. 3). The product of the DC voltage value and the DC value at this time is a power value P1. Data of the obtained product of the DC voltage value and the DC value (power value P1) may be stored in a memory (not shown in the drawing) connected to the second control circuit 124.

Then, the second control circuit 124 determines whether the power value P1 is larger than the power value P0 (see the step 210 in FIG. 3). If the second control circuit 124 determines that the power value P1 is smaller than, the power value P0, the second control circuit 124 sends an instruction to the second matching circuit 123 and the first matching circuit 113 to reverse the direction in which the parameter set is shifted (see the step 212 in FIG. 3). If the second control circuit 124 determines that the power value P1 is larger than the power value P0, the second control circuit 124 sends an instruction to the second matching circuit 123 and the first matching circuit 113 to keep the direction in which the parameter set is shifted (see the step 211 in FIG. 3).

Next, the second control circuit 124 substitutes the power value P1 for the power value P0 (see the step 213 in FIG. 3). After that, the step 203 restarts and the subsequent process is conducted again. In other words, until the load 121 charging is completed, a loop process including the steps 203 to 213 is repeated.

Suppose, for example, that in a repeat of loop processes each including the steps 203 to 213, the second control circuit 124 obtains the product of a DC voltage value and a DC value given by the parameter set No. j−1 (P0=$W_{j-1}$), and then the parameter set is shifted in the positive direction, and then the second control circuit 124 obtains the product of a DC voltage value and a DC value given by the parameter set No. j (P1=$W_j$) (see the step 209 in FIG. 3).

Next, the second control circuit 124 determines whether the power value P1 is larger than the power value P0. Suppose that the second control circuit 124 determines that the power value P1 is larger than the power value P0 ($W_j$>$W_{j-1}$) (see the step 210 in FIG. 3). In this case, the second control circuit 124 sends an instruction to the second matching circuit 123 and the first matching circuit 113 to keep the direction in which the parameter set is shifted (see the step 211 in FIG. 3).

Then, the second control circuit 124 substitutes the power value P1 for the power value P0, giving the equation P0=$W_j$ (see the step 213 in FIG. 3). Consequently, the load 121 is charged for a certain period of time (see the step 203 in FIG. 3).

Subsequently, the second control circuit 124 determines whether the load 121 charging is continued. If the second control circuit 124 determines that the load 121 charging is continued (the step 204 in FIG. 3), the step 206 is taken.

Next, the second control circuit 124 determines whether the parameter set is shifted in the positive direction (see the step 206 in FIG. 3). Here, since the determination that a shift of the parameter set in the positive direction from No. j−1 to No. j gives the equation P0<P1 has already been made in the step 210, the second control circuit 124 sends an instruction to the second matching circuit 123 and the first matching circuit 113 to shift the parameter set in the positive direction from No. j to No. j+1 (see the step 207 in FIG. 3).

Then, the second control circuit 124 obtains a DC voltage value and a DC value given by the parameter set No. j+1 (see the step 208 in FIG. 3). The product of the DC voltage value and the DC value at this time is a power value P1=$W_{j+1}$.

Next, the second control circuit 124 determines whether the power value P1 is larger than the power value P0. Suppose that the second control circuit 124 determines that the power value P1 is smaller than the power value P0 ($W_j$<$W_{j+1}$) (see the step 210 in FIG. 3). In this case, the second control circuit 124 sends an instruction to the second matching circuit 123 and the first matching circuit 113 to reverse the direction in which the parameter set is shifted (see the step 212 in FIG. 3).

Then, the second control circuit 124 substitutes the power value P1 for the power value P0, giving the equation P0=$W_{j+1}$ (see the step 213 in FIG. 3). Consequently, the load 121 is charged for a certain period of time (see the step 203 in FIG. 3).

Figure 4:
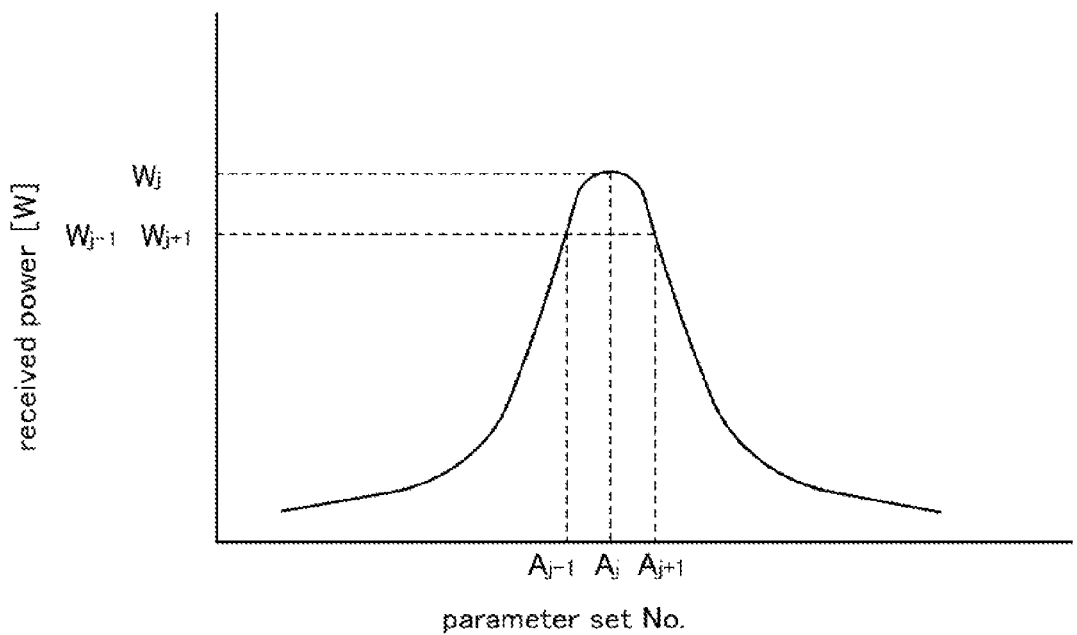
FIG. 4 is a graph used to describe the configuration of Embodiment 1.

The relation between the above-described parameter set numbers and received power is shown in FIG. 4. As shown in FIG. 4, with the parameter set No. j, if received power is at its maximum value, the maximum efficiency of power transmission is obtained when the distance from the power feeding device 110 to the power receiving device 120 is $A_j$ [cm]. Therefore, with the parameter set No. j, the power feeding device 110 can feed power efficiently to the power receiving device 120. The load 121 can be charged efficiently by repeating the steps with the parameter sets No. j and No. j+1 until the load 121 charging is completed.

Even if the distance from the power feeding device 110 to the power receiving device 120 changes during the load 121 charging, changing the parameter set number until the load 121 charging is competed enables efficient charging.

The use of the power feeding method in FIG. 3 for the wireless power feeding system in FIG. 1 allows power transmission efficiency to be maximized in accordance with the positional relationship between the power feeding device 110 and the power receiving device 120, resulting in efficient power feeding. Therefore, the power feeding system can be more convenient for users.

Next, the configuration of a wireless power feeding system that is partly different from that shown in FIG. 1 will be described with reference to FIG. 5.

A power feeding device 140 includes a high-frequency power source 111, a first coil 117, a first resonance coil 112, a capacitor 118, a first matching circuit 113, a first control circuit 114, a first transmitter-receiver circuit 115, and a first antenna 116. In the power feeding device 140, the high-frequency power source 111 is connected to the first coil 117, and the first resonance coil 112 magnetically coupled with the first coil 117 is connected to the first matching circuit 113. The first matching circuit 113 is connected to the first transmitter-receiver circuit 115 through the first control circuit 114.

The power receiving device 150 includes a load 121, a second coil 129, a second resonance coil 122, a capacitor 130, a second matching circuit 123, a second control circuit 124, a second transmitter-receiver circuit 125, and a second antenna 126. In the power receiving device 150, the second resonance coil 122 configured to be in magnetic resonance with the first resonance coil 112 is connected to the second matching circuit 123, and the second coil 129 magnetically coupled with the second resonance coil 122 is connected to the load 121 through a rectifier circuit 127 and a DCDC converter 128. The load 121 is connected to the second control circuit 124 and to the second transmitter-receiver circuit 125 through the second control circuit 124.

Note that the capacitor 118 and the capacitor 130 may be parasitic capacitance of the first resonance coil 112 and parasitic capacitance of the second resonance coil 122, respectively. Alternatively, the capacitor 118 and the capacitor 130 may be independent of these coils.

The first matching circuit 113 in the power feeding device 140 includes at least one element connected to the first resonance coil 112. The second matching circuit 123 in the power receiving device 150 includes at least one element connected to the second resonance coil 122. The element connected to the first resonance coil 112 is preferably a variable element (a variable capacitor or a variable coil). The element connected to the second resonance coil 122 is preferably a variable element (a variable capacitor or a variable coil).

The element included in the first matching circuit and connected to the first resonance coil 112 and the element included in the second matching circuit and connected to the second resonance coil 122 preferably have the same configuration. For example, when the element included in the first matching circuit 113 and connected to the first resonance coil 112 is a variable capacitor, the element included in the second matching circuit 123 and connected to the second resonance coil 122 is preferably a variable capacitor.

Figure 5:
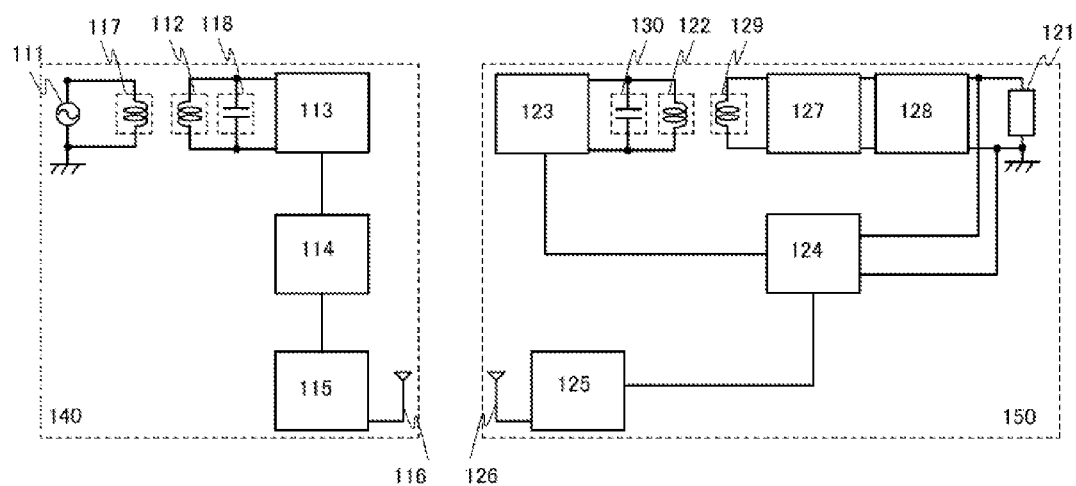
FIG. 5 is a diagram used to describe the configuration of Embodiment 1.

The wireless power feeding system in FIG. 5 achieves power transmission by the method in which the first resonance coil 112 is magnetically coupled with the first coil 117, and the second resonance coil 122 is magnetically coupled with the second coil 129, and the first resonance coil 112 is put in magnetic resonance with the second resonance coil 122. The wireless power feeding system in FIG. 5 can increase the Q factors of the first resonance coil 112 and the second resonance coil 122 and thus is characterized in that it enables long-distance power transmission compared with the wireless power feeding system in FIG. 1.

Also in the wireless power feeding system in FIG. 5, the conditions for the maximum efficiency of power transmission vary depending on the distance from the first resonance coil 112 to the second resonance coil 122.

For example, when the first resonance coil 112 and the second resonance coil 122 are placed at arbitrary locations as shown in FIG. 6B1, the maximum efficiency of power transmission is obtained with a resonance frequency f0 as shown in FIG. 6B2. However, when the first resonance coil 112 is too close to the second resonance coil 122 as shown in FIG. 6A1, peak splitting in the efficiency of power transmission occurs such that a peak appears with a frequency f0' and the lowest point between peaks appears with a resonance frequency f0 as indicated by the thin solid line in FIG. 6A2, which decreases the efficiency of power transmission. When the first resonance coil 112 is far from the second resonance coil 122 as shown in FIG. 6C1, peak splitting does not occur but the efficiency of power transmission with a resonance frequency f0 as shown in FIG. 6C2 is low compared with the case shown in FIG. 6B2. Note that FIGS. 6A1 to 6C2 only show, for convenience, the high-frequency power source 111, the first coil 117, the first resonance coil 112, the load 121, the second coil 129, and the second resonance coil 122.

By using the first matching circuit 113 and the second matching circuit 123 in the wireless power feeding system as shown in FIG. 5, the conditions for the maximum efficiency of power transmission can be set in accordance with the distance from the first resonance coil 112 to the second resonance coil 122, so that efficient power transmission can be achieved.

Especially, even when the first resonance coil 112 is too close to the second resonance coil 122 and peak splitting in the efficiency of power transmission occurs, the use of the first matching circuit 113 and the second matching circuit 123 allows a peak of transmission efficiency to appear with a resonance frequency f0 as indicated by the heavy solid line in FIG. 6A2 and thus increases the efficiency of power transmission.

Next, the configuration of a wireless power feeding system that is partly different from that shown in FIG. 5 will be described with reference to FIG. 7.

Like the power feeding device in FIG. 5, a power feeding device 160 includes a high-frequency power source 111, a first coil 117, a first resonance coil 112, a capacitor 118, a first matching circuit 113, a first control circuit 114, a first transmitter-receiver circuit 115, and a first antenna 116. The power feeding device 160 is different from the power feeding device in FIG. 5 in that its high-frequency power source 111 is connected to the first coil 117 through the first matching circuit 113 and its first resonance coil 112 magnetically coupled with the first coil 117 is connected to the capacitor 118.

Like the power receiving device in FIG. 5, the power receiving device 170 includes a load 121, a second coil 129, a second resonance coil 122, a capacitor 130, a second matching circuit 123, a second control circuit 124, a second transmitter-receiver circuit 125, and a second antenna 126. The power receiving device 170 is different from the power receiving device in FIG. 5 in that its second resonance coil 122 configured to be in magnetic resonance with the first resonance coil 112 is connected to the capacitor 130 and its second coil 129 magnetically coupled with the second resonance coil 122 is connected to the load 121 through the second matching circuit 123, a rectifier circuit 127, and a DCDC converter 128.

Note that the first resonance coil 112 and the second resonance coil 122 are preferably independent coils, while the capacitor 118 and the capacitor 130 are preferably parasitic capacitance of the first resonance coil 112 and parasitic capacitance of the second resonance coil 122, respectively. This can produce high Q factors compared with connecting an independent capacitor to each resonance coil.

Figure 7:
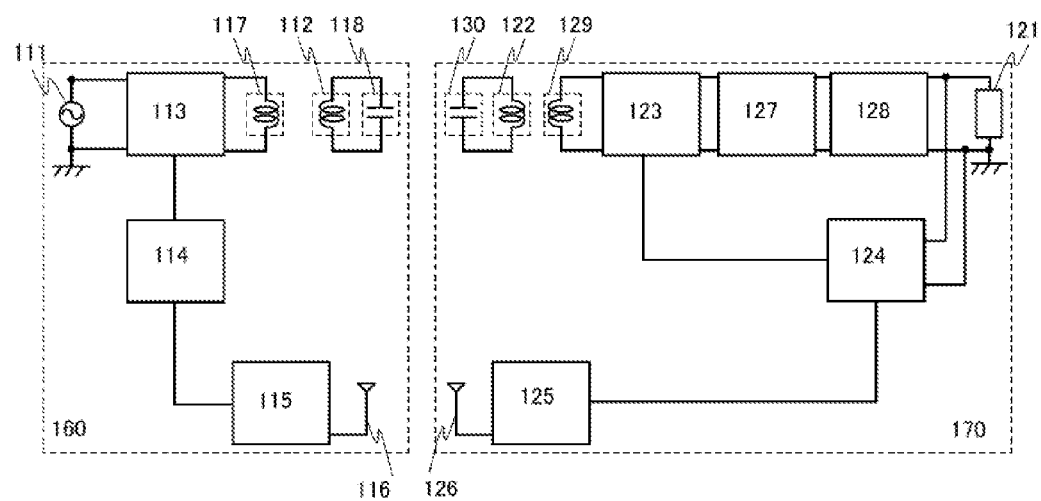
FIG. 7 is a diagram used to describe the configuration of Embodiment 1.

A resonance circuit composed of the first resonance coil 112 and the capacitor 118 and a resonance circuit composed of the second resonance coil 122 and the capacitor 130 which are shown in FIG. 5 and FIG. 7 have very high Q factors. Therefore, the Q factors may decrease due to the circuits connected to these resonance circuits, thereby decreasing the efficiency of power transmission. Thus, by providing the first matching circuit on the high-frequency power source 111 side, and the second matching circuit on the load 121 side as shown in FIG. 7, a decrease in Q factors and in the efficiency of power transmission can be suppressed.

The use of the power feeding method in FIG. 3 for the wireless power feeding systems in FIG. 5 and FIG. 7 allows the efficiency of power transmission to be increased in accordance with the positional relationship between the power feeding device and the power receiving device, resulting in efficient power feeding. Therefore, the power feeding system which is more convenient for users can be provided.

Embodiment 2

This embodiment describes the applications of the wireless power feeding system in Embodiment 1. Examples of the applications of the wireless power feeding system in one embodiment of the present invention include portable electronic appliances such as digital video cameras, personal digital assistants (e.g., mobile computers, cellular phones, portable game consoles, and electronic book devices), and image reproducing devices including recording media (specifically digital versatile discs (DVDs)); and electric mobile units powered by electricity, such as electric cars. Examples will be described below with reference to drawings.

Figure 8A:
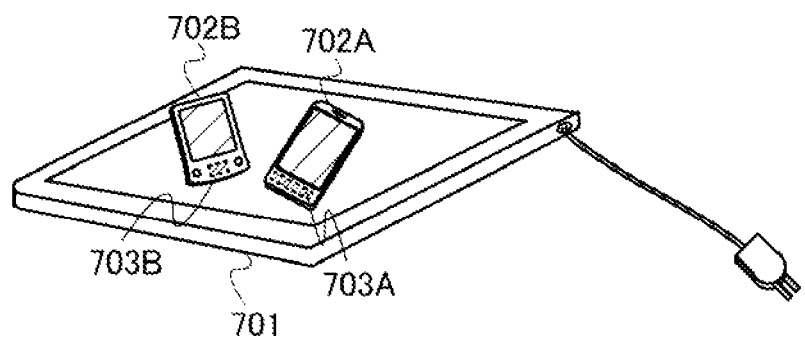
FIGS. 8A and 8B are diagrams used to describe the configuration of Embodiment 2.

FIG. 8A shows the case where the wireless power feeding system is used for a cellular phone or a personal digital assistant. In this case, a power feeding device 701, a cellular phone 702A including a power receiving device 703A, and a cellular phone 702B including a power receiving device 703B are used. The wireless power feeding system in the above embodiment can be used between the power feeding device 701 and the power receiving device 703A and between the power feeding device 701 and the power receiving device 703B.

For example, the power feeding device 701 can have the configuration of the power feeding device 110, 140, or 160 in Embodiment 1, while the power receiving device 703A and the power receiving device 703B each can have the configuration of the power receiving device 120, 150, or 170 in Embodiment 1.

The use of the wireless power feeding system in one embodiment of the present invention can increase power transmission efficiency in accordance with the positional relationship between the power feeding device 701 and the power receiving device 703A and the positional relationship between the power feeding device 701 and the power receiving device 703B, allowing the power feeding device 701 to supply power efficiently to the power receiving device 703A and the power receiving device 703B.

Figure 8B:
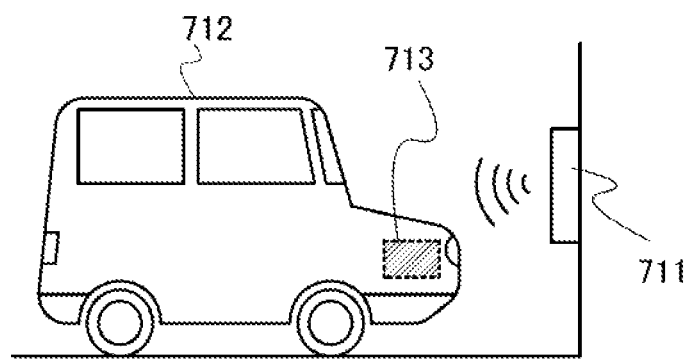

FIG. 8B shows the case where the wireless power feeding system is used for an electric car, which is an electric mobile unit. In this case, a power feeding device 711 and an electric car 712 including a power receiving device 713 are used. The wireless power feeding system in the above embodiment can be used between the power feeding device 711 and the power receiving device 713.

For example, the power feeding device 711 can have the configuration of the power feeding device 110, 140, or 160 in Embodiment 1, while the power receiving device 713 can have the configuration of the power receiving device 120, 150, or 170 in Embodiment 1.

The use of the wireless power feeding system in one embodiment of the present invention can increase power transmission efficiency in accordance with the positional relationship between the power feeding device 711 and the power receiving device 713, allowing the power feeding device 711 to supply power efficiently to the power receiving device 713.

Even when the positional relationship between the electric car 712 including the power receiving device 713 and the power feeding device 711 changes, the efficiency of power transmission can be changed as long as the parameter set is in the range shown in FIG. 2A, so that high power transmission efficiency can be achieved.

As described above, the wireless power feeding system in Embodiment 1 can be used in any object that is driven with electric power.

Embodiment 2 can be implemented in appropriate combination with any configuration in Embodiment 1.

This application is based on Japanese Patent Application serial no. 2010-287551 filed with Japan Patent Office on Dec. 24, 2010, the entire contents of which are hereby incorporated by reference.

What is claimed is:

1. A wireless power feeding system comprising:
   a power feeding device comprising:
      a power source;
      a first antenna;
      a first transmitter-receiver circuit;
      a first resonance coil configured to transmit power from the power source;
      a first matching circuit operationally connected to the first resonance coil; and
      a first control circuit configured to change an impedance of the first matching circuit in accordance with an instruction received at the first transmitter-receiver circuit through the first antenna; and
   a power receiving device comprising:
      a second resonance coil configured to be in magnetic resonance with the first resonance coil;
      a second matching circuit operationally connected to the second resonance coil;
      a second control circuit which is connected to a load and is configured to change an impedance of the second matching circuit; and
      a second transmitter-receiver circuit configured to send the instruction from a second antenna,
   wherein parameters of the first matching circuit and parameters of the second matching circuit are set according to distances from the power feeding device to the power receiving device.

2. The wireless power feeding system according to claim 1, wherein the first matching circuit and the second matching circuit have an identical circuit configuration.

3. The wireless power feeding system according to claim 1, wherein the first matching circuit comprises a first element connected to the power source in series, and a second element connected to the power source in parallel, and
   wherein the second matching circuit comprises a third element connected to the load in series, and a fourth element connected to the load in parallel.

4. The wireless power feeding system according to claim 3, wherein the first element and the third element have an identical configuration, and
   wherein the second element and the fourth element have an identical configuration.

5. The wireless power feeding system according to claim 3, wherein the first element and the third element are variable capacitors, and
   wherein the second element and the fourth element are variable coils.

6. The wireless power feeding system according to claim 1, wherein the power source is a high-frequency power source.

7. A wireless power feeding system comprising:
   a power feeding device comprising:
      a power source;
      a first antenna;
      a first transmitter-receiver circuit;
      a first resonance coil configured to transmit power from the power source;
      a first matching circuit operationally connected to the first resonance coil; and a first control circuit configured to change an impedance of the first matching circuit in accordance with an instruction received at the first transmitter-receiver circuit through the first antenna; and a power receiving device comprising:
a second resonance coil configured to be in magnetic resonance with the first resonance coil;
a second matching circuit operationally connected to the second resonance coil;
a second control circuit which is connected to a load and is configured to change an impedance of the second matching circuit; and
a second transmitter-receiver circuit configured to send the instruction from a second antenna,
wherein the first resonance coil is connected to the power source through the first matching circuit, and
wherein parameters of the first matching circuit and parameters of the second matching circuit are set according to distances from the power feeding device to the power receiving device.

8. The wireless power feeding system according to claim 7, wherein the first matching circuit and the second matching circuit have an identical circuit configuration.

9. The wireless power feeding system according to claim 7, wherein the first matching circuit comprises a first element connected to the power source in series, and a second element connected to the power source in parallel, and
wherein the second matching circuit comprises a third element connected to the load in series, and a fourth element connected to the load in parallel.

10. The wireless power feeding system according to claim 9,
wherein the first element and the third element have an identical configuration, and
wherein the second element and the fourth element have an identical configuration.

11. The wireless power feeding system according to claim 9,
wherein the first element and the third element are variable capacitors, and
wherein the second element and the fourth element are variable coils.

12. The wireless power feeding system according to claim 9,
wherein the power source is a high-frequency power source.

13. A wireless power feeding system comprising:
a power feeding device comprising:
a power source;
a first antenna;
a first transmitter-receiver circuit;
a first resonance coil configured to transmit power from the power source;
a first coil connected to the power source;
a first matching circuit operationally connected to the first resonance coil; and
a first control circuit configured to change an impedance of the first matching circuit in accordance with an instruction received at the first transmitter-receiver circuit through the first antenna; and
a power receiving device comprising:
a second resonance coil configured to be in magnetic resonance with the first resonance coil;
a second coil connected to a load;
a second matching circuit operationally connected to the second resonance coil;
a second control circuit which is connected to the load and is configured to change an impedance of the second matching circuit; and
a second transmitter-receiver circuit configured to send the instruction from a second antenna,
wherein the first coil is magnetically coupled with the first resonance coil, and
wherein the second coil is magnetically coupled with the second resonance coil.

14. The wireless power feeding system according to claim 13, wherein the first matching circuit and the second matching circuit have an identical circuit configuration.

15. The wireless power feeding system according to claim 13,
wherein the first matching circuit comprises a fifth element connected to the first resonance coil, and
wherein the second matching circuit comprises a sixth element connected to the second resonance coil.

16. The wireless power feeding system according to claim 15, wherein the fifth element and the sixth element are variable capacitors.

17. The wireless power feeding system according to claim 13, wherein the power source is a high-frequency power source.

18. A wireless power feeding system comprising:
a power feeding device comprising:
a first antenna;
a power source;
a first transmitter-receiver circuit;
a first resonance coil configured to transmit power from the power source;
a first coil connected to the power source;
a first matching circuit operationally connected to the first resonance coil; and
a first control circuit configured to change an impedance of the first matching circuit in accordance with an instruction received at the first transmitter-receiver circuit through the first antenna; and
a power receiving device comprising:
a second resonance coil configured to be in magnetic resonance with the first resonance coil;
a second coil connected to a load;
a second matching circuit operationally connected to the second resonance coil;
a second control circuit which is connected to the load and is configured to change an impedance of the second matching circuit; and
a second transmitter-receiver circuit configured to send the instruction from a second antenna,
wherein the first coil is magnetically coupled with the first resonance coil,
wherein the second coil is magnetically coupled with the second resonance coil, and
wherein the first coil is connected to the power source through the first matching circuit.

19. The wireless power feeding system according to claim 18, wherein the first matching circuit and the second matching circuit have an identical circuit configuration.

20. The wireless power feeding system according to claim 18,
wherein the first matching circuit comprises a fifth element connected to the first resonance coil, and
wherein the second matching circuit comprises a sixth element connected to the second resonance coil.

21. The wireless power feeding system according to claim 20, wherein the fifth element and the sixth element are variable capacitors.

22. A power feeding device comprising:
a power source;
an antenna;
a transmitter-receiver circuit;
a first resonance coil configured to transmit power from the power source to a second resonance coil in a power receiving device;
a matching circuit operationally connected to the first resonance coil; and
a control circuit configured to change an impedance of the matching circuit in accordance with an instruction which is received at the transmitter-receiver circuit through the antenna and is sent from the power receiving device,
wherein parameters of the matching circuit are set according to distances from the power feeding device to the power receiving device.

23. The power feeding device according to claim 22,
wherein the matching circuit comprises a variable element.

24. A power feeding device comprising:
a power source;
an antenna;
a transmitter-receiver circuit;
a first resonance coil configured to transmit power from the power source to a second resonance coil in a power receiving device;
a coil connected to the power source;
a matching circuit operationally connected to the first resonance coil; and
a control circuit configured to change an impedance of the matching circuit in accordance with an instruction which is received at the transmitter-receiver circuit through the antenna and is sent from the power receiving device,
wherein the coil is magnetically coupled with the first resonance coil.

25. The power feeding device according to claim 24,
wherein the matching circuit comprises a variable element.

26. The power feeding device according to claim 24,
wherein the coil is connected to the power source through the matching circuit.

27. The wireless power feeding system according to claim 13,
wherein parameters of the first matching circuit and parameters of the second matching circuit are set according to distances from the power feeding device to the power receiving device.

28. The wireless power feeding system according to claim 18,
wherein parameters of the first matching circuit and parameters of the second matching circuit are set according to distances from the power feeding device to the power receiving device.

29. The power feeding device according to claim 24,
wherein parameters of the matching circuit are set according to distances from the power feeding device to the power receiving device.

* * * * *